3,129,746
WELDING APPARATUS
Milton F. Kroesch, Waukesha, Wis., assignor to Pressed Steel Tank Company, Milwaukee, Wis., a corporation of Wisconsin
Filed Feb. 2, 1962, Ser. No. 170,714
9 Claims. (Cl. 158—27.4)

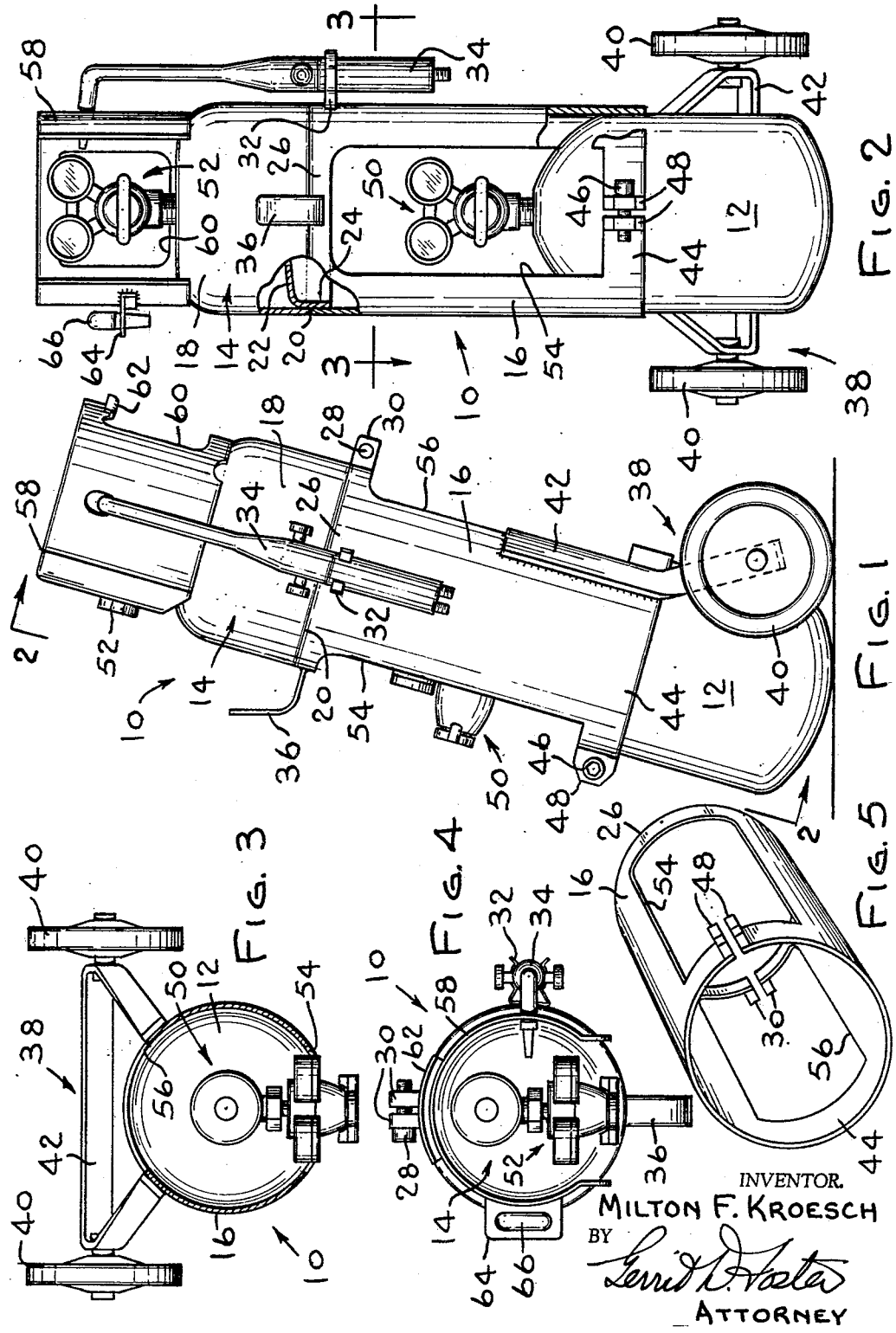

This invention relates to gas welding and/or cutting units.

A general object of this invention is the provision of a gas welding and/or cutting unit which is particularly well suited for use in emergency vehicles, such as ambulances, on farms, in small shops or wherever there is no great demand for a welding unit but where the availability of a welding unit is highly desirable and ready portability of the unit is essential.

Further, it is proposed to provide a rugged and durable welding unit utilizing a basically low cost construction wherein the supply tanks are so connected as to become an integral part of the support structure for the unit and wherein ample provision is made for connecting accessory items on the unit thereby achieving a compact, readily portable, self-contained, relatively inexpensive and unitary welding unit.

The novel features of this invention are set forth in the appended claims. The invention itself, together with additional objects and advantages thereof, will be more clearly understood from a reading of the following description in connection with the accompanying drawings wherein a preferred embodiment of the invention has been illustrated and in which:

FIG. 1 is a side elevation;

FIG. 2 is a front elevation;

FIG. 3 is a sectional view taken along lines 3—3 of FIG. 2;

FIG. 4 is a top view; and

FIG. 5 is a perspective view of the connecting bracket.

With particular reference to the drawings, a welding unit 10 includes a lower oxygen tank 12 and an upper acetylene fuel tank 14. For convenience, unit 10 is referred to as a welding unit but it can be used to perform a cutting operation, and where it is to be used primarily for cutting and only secondarily for welding tank 14 can be filled with other suitable fuels, such as propane, instead of acetylene. Further, although the most common uses of unit 10 are either welding or cutting, it can have many other varied uses as is well known in the art and, therefore, it should be understood that this invention is not to be strictly limited to a welding unit.

A generally cylindrical bracket 16 supports tanks 12 and 14 in vertically spaced relation, preferably with oxygen tank 12 disposed at the bottom and acetylene tank 14 disposed at the top of unit 10. With this arrangement tank 14, being a relatively low pressure vessel, can have a simple two-piece construction for economy and to facilitate its support in the unit. More particularly, tank 14 includes a body portion 18 having a lower edge 20 defining an open bottom in which is positioned a dome-shaped closure 22 having its end 24 extending below edge 20 of body 18. In this manner a stepped configuration is provided at the lower end of tank 14 for receiving the upper end 26 of bracket 16. Upper end 26 is clamped on end 24 of closure 22 by bolt 28 in ears 30 and with its upper end in abutting relation with edge 20 of body 18. A flush connection is then provided at the juncture between tank 14 and bracket 16 and tank 14 is partially supported by the abutting engagement between it and the bracket so that the entire support for tank 14 need not be furnished by the clamping action of end 26 on tank 14.

Bracket 16 in addition to supporting the tanks in vertical spaced relationship, also provides a convenient mounting for various accessories. More particularly, spring clamp 32 for supporting torch 34 and bracket 36 for supporting the hoses (not shown) used to supply oxygen and fuel to torch 34 are suitably attached to bracket 16. Also a carriage 38 including a pair of wheels 40 is connected in the unit by a frame 42 welded to bracket 16. Lower end 44 of bracket 16 is positioned intermediate the ends of oxygen tank 12 and clamped at that point by bolt 46 and ears 48, oxygen tank 12 extends below the lower end of the bracket and cooperates with wheels 40 to provide a stable three-point support for the unit. In this regard it should be kept in mind that in a welding unit the ratio of oxygen to fuel is normally two to one. The oxygen tank is proportionally larger in size than the fuel tank so that both empty substantially simultaneously and the larger oxygen tank is positioned in the lowermost portion of the unit for increased stability.

The oxygen and fuel tanks of prior art welding units are self-supporting, for example the oxygen tanks were provided with relatively expensive "bumped-back" bottoms. This self-supporting feature is preserved and in fact enhanced in that the three-point support is far more stable and the lower oxygen tank can have a relatively less expensive ellipsoidal bottom.

Oxygen tank 12 and acetylene tank 14 are each provided with flow regulating means 50 and 52 respectively to which are attached the hoses (not shown) supplying torch 34. It will be noted that bracket 16 provides the additional function of protecting flow control means 50 and includes access apertures 54 and 56. Attached to the top of tank 14 is a generally U-shaped shield 58 which partially surrounds and protects flow control means 52. Since fuel tank 14 is a relatively low pressure vessel, shield 58 can be simply and securely attached thereto by welding. In addition to protecting the flow control means shield 58 includes an aperture 60 having an upper rolled edge 62 which provides a handle for manipulating unit 10. Still further, shield 58 provides an additional member on which accessories can be mounted, e.g., bracket 64 welded thereto for supporting case 66 for extra torch tips.

The size of the welding unit constructed in accordance with this invention can be varied as desired; however, in keeping with the object of providing ready portability, the unit is preferably approximately one and one-half to four feet high and four to eight inches in diameter. The unit is completely self contained and has the appearance, compactness and requires, at the most, no more space than would a single tank presently used in the common welding units. The self contained unit is readily portable and can be hand carried, wheeled or carried on the back of an operator, e.g., a diver having to perform underwater welding or cutting operations, and is therefore particularly well suited for use where the demand for welding or cutting is not great enough to warrant a large welding unit but where the availability of a portable unit is desirable. Furthermore, it will be noted that the supply tanks have been positioned for optimum results from both an economy and structural standpoint.

The discussion of this invention with regard to a particular preferred embodiment thereof has been intended for illustrative purposes only and should not be taken by way of limitation. Accordingly, it is intended in the appended claims to cover all modifications and embodiments of this invention as fall within the true spirit and scope thereof.

What I claim is:

1. The combination comprising, a first tank, a second tank positioned above and spaced from said first tank, said second tank having a lower edge defining an open bottom and a dome-shaped closure positioned in said open bottom and extending beyond said lower edge, a generally tubular bracket having one end clamped on said closure in abutting relation with said lower edge and its other end clamped on said first tank intermediate the ends thereof, and a carriage supported from said bracket and with said first tank providing a three-point support.

2. The combination of claim 1 wherein said first and second tanks are oxygen and fuel tanks respectively and include flow regulating means on the top of each of said tanks, said bracket substantially enclosing said flow regulating means for said first tank, and a generally U-shaped shield fixed to said second tank in partial surrounding relationship with the flow regulating means for said second tank.

3. The combination of claim 2 wherein said U-shaped shield includes a handle portion.

4. The combination, comprising, first and second relatively vertically spaced tanks, a generally hollow bracket provided with an aperture intermediate the ends thereof and having its ends clamped on respective ones of said tanks, first flow control means connected on said first tank and disposed within said bracket, second flow control means connected on the top of said second tank, and means fixed to the top of said second tank substantially surrounding and protecting said second flow control means, and means for supporting said combination.

5. The combination of claim 4 wherein said second tank extends below the lower end of said bracket, and said support means comprises a carriage supported from said bracket which in cooperation with said second tank provides a three-point support.

6. Welding, cutting or the like apparatus comprising, a first tank, a second tank, means fixedly connecting said tanks in vertical spaced relation with the lower one of said tanks extending below said connecting means, and means cooperating with said lower tank to provide a support for said combination.

7. The combination comprising, a first tank, a second tank positioned above and in spaced relation from said first tank, said second tank having a lower portion characterized by a stepped configuration, an elongated generally hollow bracket member having one end engaging the stepped configuration of the lower portion of said second tank and its other end clamped to said first tank, said first and second tanks including flow control means with the flow control means of said first tank positioned in and protected by said bracket member.

8. The combination of claim 7 including carriage means providing support for and movement of the combination.

9. The combination comprising, first and second relatively vertically spaced tanks, support means extending between and engaging said first and second tanks for fixedly supporting said tanks in said relative vertical spaced relation, flow control means connected to each of said first and second tanks with one of said flow control means positioned within and protected by said support means, and means for supporting the combination.

References Cited in the file of this patent

UNITED STATES PATENTS

| | | |
|---|---|---|
| 627,987 | Dick | July 4, 1899 |
| 1,017,102 | Kaufman | Feb. 13, 1912 |
| 2,576,725 | Schoelles | Nov. 27, 1951 |
| 2,956,708 | Nusbaum | Oct. 18, 1960 |
| 2,962,182 | Rossheim | Nov. 29, 1960 |

FOREIGN PATENTS

| | | |
|---|---|---|
| 461,654 | Great Britain | Feb. 22, 1937 |
| 1,007,183 | Germany | Apr. 25, 1957 |